(12) United States Patent
Sodemann et al.

(10) Patent No.: US 7,326,663 B2
(45) Date of Patent: Feb. 5, 2008

(54) SPUNBONDED NONWOVEN MADE OF ENDLESS FIBERS

(75) Inventors: Ralf Sodemann, Peine (DE); Michael Voges, Hoechst (DE)

(73) Assignee: Fiberweb Corovin GmbH, Peine (DE)

( * ) Notice: Subject to any disclaimer, the term of this patent is extended or adjusted under 35 U.S.C. 154(b) by 343 days.

(21) Appl. No.: 11/068,132

(22) Filed: Feb. 28, 2005

(65) Prior Publication Data

US 2005/0164588 A1   Jul. 28, 2005

Related U.S. Application Data

(63) Continuation of application No. PCT/EP03/08336, filed on Jul. 29, 2003.

(30) Foreign Application Priority Data

Aug. 28, 2002  (DE) .............................. 102 40 191

(51) Int. Cl.
  *D04H 3/16*   (2006.01)
  *D04H 13/00*  (2006.01)
  *B32B 5/26*   (2006.01)

(52) U.S. Cl. ..................... 442/401; 442/361; 442/381; 428/296.1; 428/297.1

(58) Field of Classification Search ................ 442/401, 442/361, 381
See application file for complete search history.

(56) References Cited

U.S. PATENT DOCUMENTS

| | | | |
|---|---|---|---|
| 4,239,720 A | 12/1980 | Gerlach et al. | |
| 4,472,329 A | 9/1984 | Muschelknautz et al. | |
| 5,011,698 A | 4/1991 | Antoon, Jr. et al. | |
| 5,075,161 A | 12/1991 | Nyssen et al. | |
| 5,260,003 A | 11/1993 | Nyssen et al. | |
| 5,573,717 A | 11/1996 | Peiffer et al. | |
| 5,669,900 A * | 9/1997 | Bullwinkel et al. | ......... 604/391 |
| 5,672,415 A | 9/1997 | Sawyer et al. | |
| 5,733,822 A | 3/1998 | Gessner et al. | |
| 5,759,926 A | 6/1998 | Pike et al. | |
| 5,783,503 A | 7/1998 | Gillespie et al. | |
| 5,935,883 A | 8/1999 | Pike | |
| 5,965,084 A | 10/1999 | Nishijima | |
| 5,990,376 A * | 11/1999 | Inoue et al. | ................. 604/378 |
| 6,106,913 A | 8/2000 | Scardino et al. | |
| 2003/0129910 A1* | 7/2003 | Norton | ....................... 442/385 |

FOREIGN PATENT DOCUMENTS

| | | |
|---|---|---|
| DE | 199 62 357 A | 7/2001 |
| DE | 100 65 859 A | 7/2002 |
| EP | 0 724 029 A | 7/1996 |
| EP | 0 854 164 A | 7/1998 |
| EP | 0 915 192 A | 5/1999 |
| JP | 2000 017558 A | 1/2000 |
| WO | WO 99/19131 A | 4/1999 |
| WO | WO 01/00909 A | 1/2001 |
| WO | WO 02/007528 A | 9/2002 |
| WO | WO 03/043809 A | 5/2003 |

* cited by examiner

*Primary Examiner*—Lynda Salvatore
(74) *Attorney, Agent, or Firm*—Alston & Bird LLP

(57) ABSTRACT

This invention relates to a spunbonded nonwoven made of thermoplastic material, which exhibits a filament diameter of less than 1.0 µm. The filaments are made from bursted fibers, whereby the filaments exhibit a length of at least five centimeters and are connected to one another at discrete points.

23 Claims, 3 Drawing Sheets

SPUNBONDED NONWOVEN MADE OF ENDLESS FIBERS

CROSS-REFERENCE TO RELATED APPLICATIONS

This application is a continuation of PCT Application No. PCT/EP2003/008336, filed Jul. 29, 2003, which claims priority from German Application No. 102 40 191.8, filed Aug. 28, 2002, which are hereby incorporated herein in its entirety by reference.

BACKGROUND OF THE INVENTION

The present invention relates to a spunbonded nonwoven made of thermoplastic material. The spunbonded nonwoven has filaments having a filament diameter of less than 2 μm, the filaments being made from bursted fibers.

A device for producing a nonwoven is known from European Patent Application 0 724 029 B1, in which a Laval nozzle is positioned downstream of a spinning nozzle. The thermoplastic material coming out of the spinning nozzle is drawn through the Laval nozzle using cold air, the air forming a laminar flow. Positioning a spinning nozzle and a Laval nozzle one behind the other is also known from European Patent Application 0 339 240 A2. In this case, however, a hot inert gas is used for cooling and stretching the fibers, the polyphenylene sulfide of the fibers used burst into individual filaments. A device is known from WO 01/00909 A1, which has a spinning nozzle and a Laval nozzle connected downstream. According to WO 01/00909 A1, a pressure difference over the Laval nozzle with simultaneous overpressure in the fiber ensures that the fiber bursts. A plurality of filaments is to result from one fiber.

The object of the present invention is to expand the technology and fields of application of bursted fibers.

SUMMARY OF THE INVENTION

The present invention provides a spunbonded nonwoven made of thermoplastic material having filaments, the filaments being made from bursted fibers. The filaments have a length of at least five centimeters, have a filament diameter of less than 1 μm, and are connected to one another at discrete points. The spunbonded nonwoven differs from previously known spunbonded nonwoven is in that it combines various properties of different spunbonded nonwoven methods. It has dimensions which are otherwise only known from meltblown spunbonded nonwovens. In addition, the plurality of fine filaments is produced by another mechanism, which in turn provides freedom in regard to the usable materials. The filaments, which are preferably made by bursting, have a filament diameter of less than 1 μm. For manufacture of the filaments, reference is made to the entire content of WO 01/00909 A1, particularly also in regard to the design of spinning nozzle, Laval nozzle, their dimensions, fluid supplies, and materials used.

A refinement provides that the filaments are only partially thermally oxidized on their surface, while other regions are not thermally oxidized. Preferably, after leaving a spinning nozzle, the not yet split fibers are kept at a temperature which allows the effect of a thermal and/or chemical oxidation to occur on the fiber surface. In particular, an oxidized layer thickness is generated which is less than 0.15 times the fiber diameter. For this purpose, the spinning speed in particular is appropriately set, as well as the distance of the mouth of the spinning nozzle to the following Laval nozzle.

According to a refinement, the thermoplastic material is heated to a temperature above 300° C., particularly in a range between 305° C. and 330° C. The exiting thermoplastic material, which forms the fiber, preferably has a fluid which contains oxygen flowing around it immediately after leaving the spinning nozzle. The fluid preferably has a temperature which lies above the melting temperature of the thermoplastic material.

Furthermore, the spunbonded nonwoven, which has filaments made of bursted fibers, may additionally have at least one addition. The addition is particularly a corpuscle which does not dissolve in the heated polymer material. Rather, the corpuscle preferably forms a bond with the thermoplastic material. According to a further embodiment, the addition at least partially provides a type of parting plane for the burst of the fibers. The addition preferably has an oblong shape as the corpuscle.

According to a further embodiment, the filaments at least partially have a corpuscle as an addition which has a diameter between 0.3 and 0.8 times a diameter of a filament. The openings in the spinning plate preferably have a diameter between 1.2 mm and 0.8 mm. Dimensioning of this type allows, for example, additives to be used to which are otherwise not usable due to their behavior, their dimensions, or their other properties. Additions which are approximately as large as the openings are also usable. For example, additions are used which have a magnitude between 0.1 mm and 0.6 mm, particularly a size between a fifth and a half of the opening size.

According to a further embodiment, the filaments of the spun fiber have super-absorbent polymer (SAP), for example. The SAP is at least partially intercalated in the filaments and is bonded to the thermoplastic material of the filaments. At least approximately 15% to approximately 45% of the filament surface is preferably covered with SAP.

A refinement provides that the spunbonded nonwoven has an additive, particularly a pigment additive, as an addition. For example, the filaments may have titanium dioxide for pigmentation. Particularly with the use of appropriate opening parameters to generate the fibers, it is possible to achieve stable spinning even if the proportion of the addition is a very high percentage. The addition may preferably make up an approximately 15% to 50% proportion of the fiber. The spunbonded nonwoven preferably has a proportion of addition of at least 10 volume-percent in the filament, preferably between 15% and 35%.

According to a further exemplary embodiment of the present invention, a spunbonded nonwoven is produced using filaments, the filaments being made from bursted fibers. At least the fibers have at least two different materials. The two materials are preferably selected in such a way that they support burst of the fibers into filaments. In particular, both materials may be supplied to the spinning nozzle while mixed with one another. Another embodiment provides that the two materials are supplied separately from one another and the fibers are subsequently produced from them. For example, the materials are two thermoplastic materials, particularly two different polymers. One of the two materials is preferably a polypropylene, while the other material is a polyethylene. Both materials may also be a polyolefin mixture. A further embodiment provides that the thermoplastic materials have different MFI. One material preferably has an MFI in a range between 15 and 30, the other material has an MFI between 25 and 45 (measured at 230° C.; 2.16 kg).

A refinement provides that the different materials form different regions of the fiber. For example, the material having a lower melting point forms an inner region of the fiber, while the material having a higher melting point forms an outer region of the fiber. In this way, the filament formation may be controlled. The inner region remains in a quasi-liquid state longer than the outer region. In this way, burst may be controlled in a targeted way. There is also the possibility of positioning the material having the lower melting point in an outer region of the fiber, while the material having the higher melting point lies in an inner region of the fiber. This is particularly preferable if the filaments are to have a surface which is only partially oxidized or influenced by chemical reaction, for example. The external material still reacts with air, for example, while the inner material is already cooled sufficiently that a reaction is avoided during or directly after the burst.

Besides a core-sheath structure of the fiber, the fiber may also have segments, each having different materials. The segments are preferably at least partially separated from one another and each form filaments. In particular, for example, a spunbonded nonwoven may be produced in this way which has thorough mixing of filaments from at least partially different materials. In this way, different material properties such as different strengths may be combined with one another in one single nonwoven layer.

A barrier material which has a water column of at least 30 cm is preferably produced using the spunbonded nonwoven layer. The barrier material has a spunbonded nonwoven made of filaments which are made from bursted fibers. In particular, the entire barrier is made only of filaments produced in this way. The barrier preferably has a basic weight of less than 30 gsm with a water column of more than 40 cm at a filament diameter of less than 0.1 µm.

According to a refinement, the barrier material is an outer layer of a product. In particular, the barrier material has no film. Rather, it may have an additional support structure such as a fabric, a net, or even a further nonwoven. In this way, it is possible to combine a high strength with a high breathing activity of the material, in particular. The barrier material preferably has a spunbonded nonwoven layer made of meltblown thermoplastic material as a support material, onto which the filaments are applied and bonded at discrete locations through the effect of heat and pressure.

A preferred application of the filament nonwoven is as a building product, which is permeable to water vapor but impermeable to water. The building product preferably has the filaments which are made from bursted fibers as the barrier material. A two-layer or multilayer nonwoven may also be used as a building product, in which, for example, the filaments are embedded between two other nonwoven layers.

A further preferred application of the filaments is in hygiene products having at least one spunbonded nonwoven layer and a liquid-absorbing core. The spunbonded nonwoven layer forms a barrier for liquid coming out of the core, the barrier being made of filaments which are made from bursted fibers.

A further application of the filaments is in a hygiene product having at least one spunbonded nonwoven layer as the overlay and a liquid-absorbing core. The spunbonded nonwoven layer is made of filaments which are made from bursted fibers. The filaments are preferably made hydrophilic, through an additional additive, for example.

Another embodiment of a product provides that a medical product is equipped with at least one spunbonded nonwoven layer, the spunbonded nonwoven layer having filaments which are made from bursted fibers. The filaments form a barrier, which is permeable to air.

A further application provides using the filaments in a hook and loop fastener system closure system having a hook region and a region in which the hooks catch. The hooks catch in a spunbonded nonwoven made of filaments, the filaments being made from bursted fibers. The filaments are preferably at least 10 cm long and, due to an embossed pattern, produce bulges in which the hooks catch.

According to a further embodiment, a spunbonded nonwoven layer made of filaments which are made from bursted fibers is used as a filter. The filaments are preferably longer than 5 cm, particularly longer than 10 cm. In this way, one single filament may be connected to its surroundings multiple times and thus secured. Particularly in regions in which high security must be provided, filter materials using these filaments are therefore preferably usable. This may relate to blood filtration and air filtration for highly clean rooms, for example. Furthermore, this filter also has a high strength. It is therefore also particularly suitable as a particle separator in the event of highly active pressure difference. The filaments may particularly be used as an extremely fine filter. At least one prefilter, which holds back the coarse particles, is preferably connected upstream to the extremely fine filter.

A further application of the filaments relates to the use as a storage medium for liquids and particularly gases. The filaments may also dispense substances or even other agents, for example, fragrance or other things.

According to a further aspect of the present invention, a method of producing a spunbonded nonwoven from thermoplastic material is provided, the spunbonded nonwoven having filaments and the filaments being made from bursted fibers. The thermoplastic material is heated before spinning to a temperature which at least partially oxidizes the fibers produced on their surface during the subsequent spinning, the fibers only splitting when the temperature inside them is cooled sufficiently that oxidation of the filament is avoided. In this case, reference is made to the entire content of WO 01/00909 A1 in regard to the type of spinning, the filaments and fibers, and particularly in regard to the construction conditions.

According to a further aspect of the present invention, a method of manufacturing a spunbonded nonwoven from thermoplastic material is provided, the spunbonded nonwoven having filaments and the filaments being made from bursted fibers. The thermoplastic material is heated before the spinning to a temperature such that during the subsequent spinning the fibers produced at least partially oxidize on their surface, heat being supplied to the filaments, after the fibers split into filaments, in such a way that the filaments also at least partially oxidize on their surface.

The heat is preferably supplied via thermal radiation or convection. For example, the nozzle downstream from the spinning nozzle is heated, so that the air guided through it is heated. In addition, the air emits heat onto the fibers and/or filaments, so that reactions may play out on the fiber and/or filament surface.

In general, it may also be advantageous to heat the nozzle downstream from the spinning nozzle for other methods of producing filaments by bursting fibers.

A further idea for manufacturing filaments from bursted fibers provides that the fluid which flows around the fibers does not only stretch the fibers and/or filaments. Rather, this fluid is at least used as a carrier for a substance, so that the substance is bonded to the fiber and/or filament surface. The substance may particularly be deposited on the particular surface.

An additional idea for manufacturing filaments from bursted fibers provides that the filaments are twisted at least at the start, in the shape of a helix, for example. Twisting of the filaments is produced before depositing, for example, in that the filaments are stretched and/or cooled differently on their surface. This particularly occurs in the moment of the bursting of the fibers. Furthermore, there is the possibility of producing twisting through bicomponent filaments. Twisting may also be performed later, by heating the filaments, for example. Twisted filaments preferably have more than one contact point with neighboring filaments, in particular, two or more filaments are twisted with one another and thus provide additional stability to the nonwoven produced. According to a refinement, the curved filaments are not bonded further to one another. Rather, the only stabilization of the nonwoven is produced by the intersection points of the filaments obtained during manufacture.

According to an additional idea of the present invention, a spunbonded nonwoven system having a first spinning beam is provided, the first spinning beam being implemented in such a way that fibers produced burst into filaments before being deposited on a movable conveyor belt. The spunbonded nonwoven system has at least one feed for thermoplastic material which forms a laminate with the filaments, the spunbonded nonwoven system having a device for bonding the filaments to the thermoplastic material. The filaments and the thermoplastic material may preferably be bonded through the effect of heat and pressure. The thermoplastic material may also, for example, be applied to the filaments, poured on in at least not yet solidified form, for example, preferably as a film. The bonding of filaments and thermoplastic material into a laminate may be supported using electrostatic charge.

The laminate may be two-layer or multilayer. The individual layers of the laminate may be bonded to one another in identical or different ways. For example, the layers may be thermobonded, using adhesive means, or may even form the laminate via hydroentanglement, for example. Adhesive means are particularly adhesive fibers, polymers which are heated and form a bond between two layers upon cooling, and, for example, hotmelt adhesives. The application of the adhesive means is preferably performed via spraying or even in the form of a foam application.

A further embodiment of a spunbonded nonwoven system having a first spinning beam, which is implemented in such a way that fibers produced burst into filaments before being deposited on a movable conveyor belt, provides that the fibers have a fluid flow against them from one side before the fibers enter a nozzle downstream from the spinning nozzle. The flow preferably occurs from a side which is perpendicular to the exit direction of the thermoplastic material from a spinning nozzle. In this way, the fibers may be enveloped by the fluid. This offers the advantage that largely laminar flow is provided from the start and the fluid does not have to be deflected before it flows onto the thermoplastic material.

According to a further idea of the present invention, a spunbonded nonwoven system having a first spinning beam is provided, the first spinning beam being implemented in such a way that fibers produced burst into filaments before being deposited on a movable conveyor belt. The spunbonded nonwoven system has a heating device in order to heat the fluid streaming around the fibers to a temperature above the melting temperature of a thermoplastic material of the fibers. In this way, complete surface oxidation of the filaments may occur, for example. Also, agglutination of the filaments with one another may be produced in this way. Subsequent further stabilization of the nonwoven produced is preferably dispensed with in this way.

An additional idea of the present invention, which may also be refined independently thereof, provides a method of generating a film made of thermoplastic material. The thermoplastic material is guided through a slot in order to form a film, the film subsequently being guided through a nozzle in the not yet completely solidified state, a pressure difference over the nozzle acting on the not yet solidified film. Bodies, particularly solid bodies, which are partially exposed through subsequent partial burst of the film, are preferably enclosed in the not yet solidified film.

Furthermore, a film made of thermoplastic material having enclosed solid bodies is provided, the surface of the film being at least partially bursted. The film is preferably microporous. The microporosity is advantageously achieved in that during burst of the film surface, stretching of the film occurs and/or the thermoplastic material around the solid bodies remains in a quasi-liquid, and therefore movable state, longer than the remaining thermoplastic material. The solid bodies preferably have a higher heat capacity than the thermoplastic material. This principle is also usable for filament formation.

BRIEF DESCRIPTION OF THE DRAWINGS

Further advantageous embodiment and refinements, as well as features, are illustrated and described in the following drawing.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
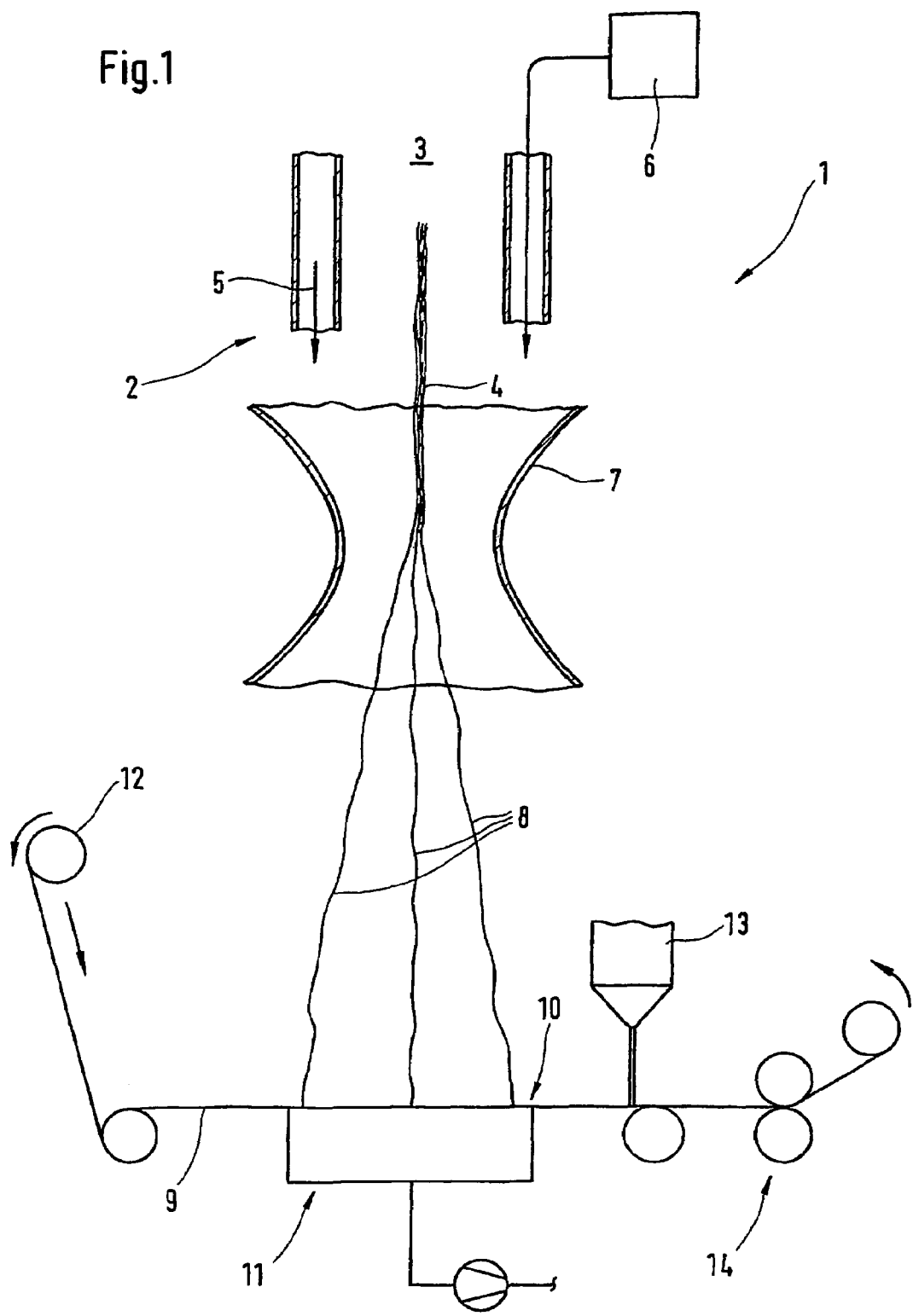
FIG. 1 shows a schematic view of a spunbonded nonwoven system.

FIG. 1 shows a schematic view of a spunbonded nonwoven system 1. A molten thermoplastic material 3 comes out of a spinning nozzle 2 and forms a fiber 4. The fiber is surrounded by a fluid stream 5, which is indicated by arrows. The fluid stream 5 advantageously encloses the fiber 4 directly after the thermoplastic material 3 leaves the spinning nozzle 2. The fluid stream may be heated using a heater 6, particularly above a melting temperature of the thermoplastic material. If multiple thermoplastic materials are used to form the fiber 4, heating may also be performed in such a way that the melting temperature of only one of the thermoplastic materials is exceeded. The fiber 4 enters a nozzle 7, which is preferably a Laval nozzle. The fluid stream 5 accelerates the fiber 4, and stretches it at the same time. Simultaneously, due to the acceleration in the nozzle 7, the pressure is reduced. As the fiber 4 exits and/or while it is inside the nozzle 7, the fiber 4 bursts, multiple filaments 8 being formed from the single fiber 4. The filaments 8 are deposited on a movable conveyor belt 9 and form a still unbonded spunbonded nonwoven 10. A suction device 11 is preferably positioned below the conveyor belt 9. The suction device 11 continues the fluid stream 5, so that the filaments 8 may be deposited on the conveyor belt 9 with as little interference as possible. The conveyor belt is preferably positioned at a distance of less than 50 cm to the spinning nozzle 2. This distance may particularly be varied in order to be able to adjust different product properties. In particular, the distance of the nozzle 7 to the spinning nozzle 2 may also be varied. A prebonded nonwoven, a film, a net, or another material is supplied to the conveyor belt 9 via a first feed 12 for thermoplastic material. This material may be used, for example, as a support structure. A molten thermoplastic material, for example, is applied to the filaments 8 via a second feed 13, the thermoplastic material forming a film. A device 14 for bonding the filaments 8 to the thermoplastic material is positioned after the second feed.

Figure 2:
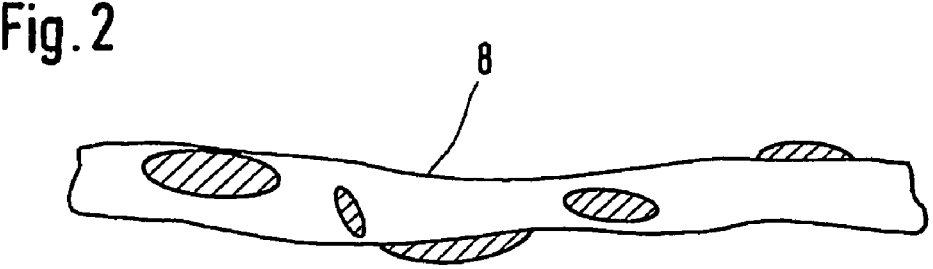
FIG. 2 shows a schematic view of a filament.

FIG. 2 shows a schematic view of a filament 8 which is partially curved. A curvature may particularly be so strongly pronounced that the filament twists and assumes a three-dimensional shape at the same time. In this way, the overall length is reduced and the filament 8 simultaneously occupies a larger volume. Furthermore, it is shown that the filament 8 has corpuscles, for example, additives or other things, which may be located on the surface and also inside the filament 8.

Figure 3:
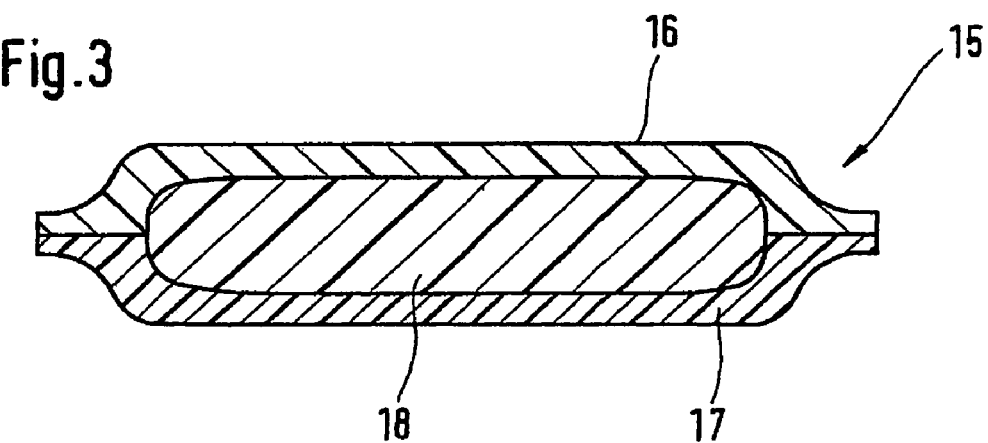
FIG. 3 shows a schematic view of a hygiene product.

FIG. 3 shows a schematic view of a hygiene product 15 having a liquid-permeable top sheet 16 and a liquid-impermeable back sheet 17. A liquid-absorbing and liquid-storing core 18 is positioned between the top sheet 16 and the back sheet 17. Preferably, the top sheet and the back sheet have filaments as described above. The filaments of the top sheet are preferably made hydrophilic, while the filaments of the back sheet are preferably made hydrophobic.

Figure 4:
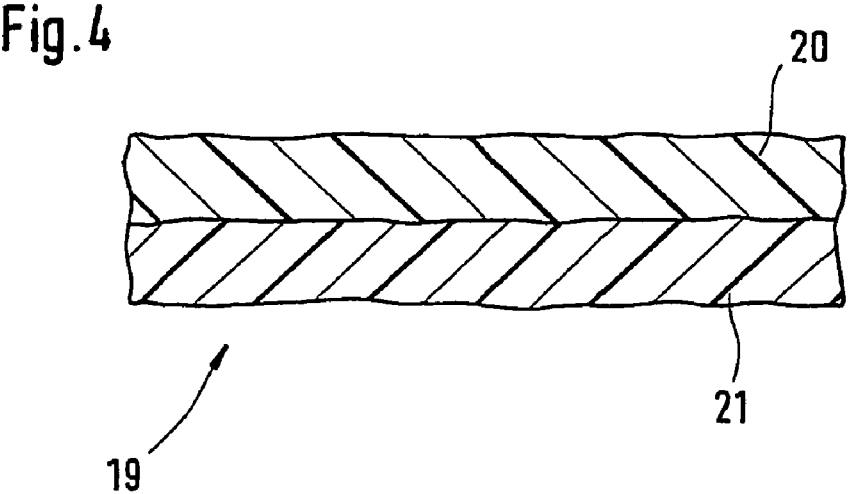
FIG. 4 shows a schematic view of a layered product having a barrier material.

FIG. 4 shows a schematic view of a layered product 19 having a barrier material 20. The barrier material has filaments as described above. A reinforcement nonwoven 21 is positioned neighboring the barrier material 20, for example. The barrier material 20 and/or the layered product 19 may be used in different products, for example, in building products, in medical products, in filter applications, in hygiene products, as a storage medium, as a noise absorbing device, in sanitary products, in household products, in packaging, etc.

Figure 5:
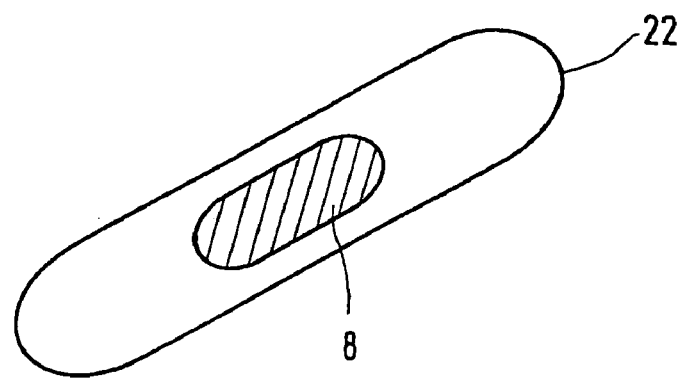
FIG. 5 shows a schematic view of a medical product.

FIG. 5 shows a schematic view of a medical product. As indicated here, the medical product is an adhesive bandage 22, for example. The plaster has filaments 8 as a wound dressing. These are capable of covering the wound with active breathing and simultaneously letting through moisture in vapor form and/or liquid to a storage layer, for example. On the other hand, particles or other things are held back. According to an embodiment which is not shown in greater detail, at least the predominant part of the medical product may also have filaments 8. Besides the use for adhesive bandages, the filaments may also be used in operating garments, parts thereof, in gloves, protective overalls, covers, etc.

Figure 6:
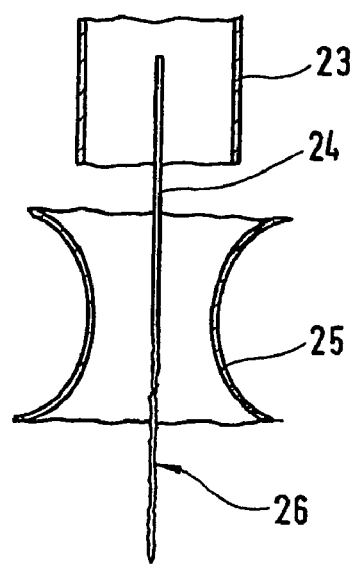
FIG. 6 shows a schematic view of a film manufacture device.

FIG. 6 shows a schematic view of a film manufacture device having a slot nozzle 23, from which the molten thermoplastic material exits and forms a film 24. The film 24 is guided through a neighboring nozzle 25 and stretched by air (not shown in more detail). Due to a pressure difference over the nozzle 25, the film 24 at least partially bursts on its surface 26.

Figure 7:
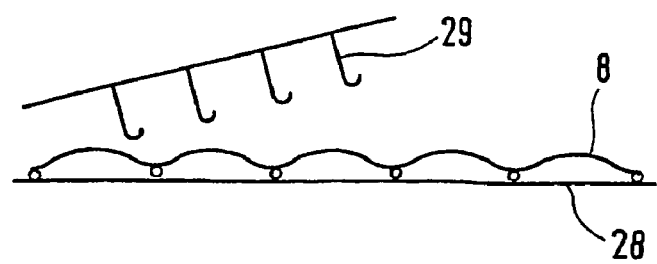
FIG. 7 shows a schematic view of a hook and loop fastener system.

FIG. 7 shows a schematic view of a hook and loop fastener system 27. The filaments 8 are partially bonded to a carrier 28 and form hooking zones for corresponding hooks 29 of the system 27.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A spunbonded nonwoven made of thermoplastic material in the form of filaments made from bursted fibers by bursting a fiber into filaments, wherein the filaments have a length of at least five centimetres, a filament diameter of less than 1.0 µm, and are connected to one another at discrete points.

2. A spunbonded nonwoven made of thermoplastic material in the form of filaments made from bursted fibers, wherein the filaments have a length of at least five centimetres. A filament diameter of less than 1.0 µm, and are connected to one another at discrete points ,wherein the filaments are thermally oxidised on the surface only in part areas, while other areas are not thermally oxidised.

3. A spunbonded nonwoven according to claim 1, wherein the filaments include an addition.

4. The spunbonded nonwoven according to claim 3, wherein the filaments include at least one corpuscle as an addition, which has a diameter from 0.3 to 0.8 times a diameter of a filament.

5. A spunbonded nonwoven made of thermoplastic material in the form of filaments made from bursted fibers, wherein the filaments have a length of at least five centimetres, a filament diameter of less than 1.0 µm, and are connected to one another at discrete points, wherein the filaments include an addition and wherein the addition includes SAP.

6. The spunbonded nonwoven according to claim 3, wherein the addition has a colour or dye additive.

7. The spunbonded nonwoven according to claim 1, wherein the addition has a proportion of at least 10% by volume of filament.

8. The spunbonded nonwoven according to claim 1, wherein the fibers include at least two different active substances.

9. The spunbonded nonwoven according to claim 8, wherein the active substances are two thermoplastic materials.

10. The spunbonded nonwoven according to claim 9, wherein the thermoplastic materials exhibit a different MFI.

11. The spunbonded nonwoven according to claim 8, wherein the filaments, which are derived from a fiber, include different polymers.

12. The spunbonded nonwoven according to claim 1, wherein it is a barrier material which has a water colunm of at least 30 cm.

13. The spunbonded nonwoven according to claim 12, wherein it forms an outer layer of a product.

14. The spunbonded nonwoven according to claim 12, wherein the barrier material includes a nonwoven layer of meltblown thermoplastic material as a support material, on which the filaments are located and are connected at discrete points by the effect of heat and pressure.

15. The spunbonded nonwoven according to claim 12, wherein it is part of a building product which is permeable to water vapour but impermeable to water, whereby it forms a barrier material derived from said bursted fibers.

16. The spunbonded nonwoven according to claim 12, wherein it is part of a hygiene product with at least one spunbonded nonwoven layer and a liquid-absorbent core, whereby the spunbonded nonwoven layer forms a barrier to liquid emerging from the core and consists of filaments derived from said bursted fibers.

17. A hygiene product with at least one spunbonded nonwoven layer as a top sheet and a liquid-absorbent core, wherein the spunbonded nonwoven layer includes filaments which are derived from bursted fibers according to claim 1.

18. A medical product with at least one spunbonded nonwoven layer, wherein the spunbonded nonwoven layer includes filaments derived from bursted fibers according to claim 1, whereby the filaments form a barrier which is air-permeable.

19. A hook and loop fastener system with a hook area and an area in which the hooks catch and engage, wherein the hooks catch and engage in a spunbonded nonwoven made of filaments derived from bursted fibers according to claim 1.

20. A method for the manufacture of a spunbonded nonwoven made of thermoplastic material according to claim 1, wherein the spunbonded nonwoven has filaments and the filaments are derived from bursted fibers, wherein the thermoplastic material is heated before spinning to a temperature such that, during the subsequent spinning, the fibers which are produced are at least in part oxidised on their surface, while the fibers do not burst until the temperature in their interior has dropped sufficiently far for oxidation of the filament to be avoided.

21. A spunbonded nonwoven system for the production of a spunbonded nonwoven according to claim 1, comprising a first spinning beam designed in such a way that fibers produced from the spinning beam burst before being deposited on a movable conveyor belt, wherein provision is made for the fibers to be subjected to a flow on one side before the fibers enter a nozzle, and a heating device is provided for heating the fluid flowing around the fibers to a temperature above the melt temperature of the thermoplastic material of the fibers.

22. A method for the manufacture of a spunbonded nonwoven made of thermoplastic material according to claim 21, wherein the spunbonded nonwoven has filaments and the filaments are derived from bursted fibers, wherein the thermoplastic material is heated before spinning to a temperature such that, during the subsequent spinning, the filaments which are produced are at least in part oxidised on their surfaces, whereby, after the burst of the fibers to form filaments a heat transfer to the filaments takes place which even oxizises these at least partially on their surface.

23. A spunbonded nonwoven system according to claim 21, wherein the first spinning beam is designed in such a way that fibers produced burst before being deposited on a movable conveyor belt, wherein the spunbonded nonwoven system includes at least one feed for a thermoplastic material which, with the filaments, forms a laminate, whereby the spunbonded nonwoven system has a device for bonding the filaments with the thermoplastic material.

* * * * *

UNITED STATES PATENT AND TRADEMARK OFFICE
CERTIFICATE OF CORRECTION

| | | |
|---|---|---|
| PATENT NO. | : 7,326,663 B2 | Page 1 of 1 |
| APPLICATION NO. | : 11/068132 | |
| DATED | : February 5, 2008 | |
| INVENTOR(S) | : Sodemann et al. | |

It is certified that error appears in the above-identified patent and that said Letters Patent is hereby corrected as shown below:

<u>Column 8,</u>

Line 26, ". A" should read --, a--;

Line 61, "colunm" should read --column--.

Signed and Sealed this

Seventeenth Day of June, 2008

JON W. DUDAS
*Director of the United States Patent and Trademark Office*